United States Patent [19]

Roe et al.

[11] Patent Number: 4,578,255

[45] Date of Patent: Mar. 25, 1986

[54] PURIFICATION OF BAYER PROCESS LIQUORS

[75] Inventors: William J. Roe, Aurora, Ill.; John T. Malito, Baton Rouge, La.

[73] Assignees: Kaiser Aluminum Chemical Corporation, Oakland, Calif.; Nalco Chemical Company, Oak Brook, Ill.

[21] Appl. No.: 686,803

[22] Filed: Dec. 27, 1984

[51] Int. Cl.$^4$ ............................ C01F 7/02; C01F 7/06
[52] U.S. Cl. ................................. 423/130; 423/121; 423/122
[58] Field of Search ..................... 423/121, 122, 130

[56] References Cited

U.S. PATENT DOCUMENTS

| | | | |
|---|---|---|---|
| 4,146,573 | 3/1979 | Kane | 423/121 |
| 4,275,042 | 6/1981 | Lever | 423/130 |

Primary Examiner—Herbert T. Carter
Attorney, Agent, or Firm—Andrew E. Barlay

[57] ABSTRACT

Bayer process liquors derived from the digestion of bauxites with a caustic solution are purified by removing at least a portion of the organic impurities present in the liquors. Removal of these impurities is accomplished by treating liquor containing dispersed therein solids generated by the Bayer process or added thereto, such as red mud particles, alumina trihydrate, oxalate salt, or filter aid with an organic polymeric, water-soluble cationic quaternary ammonium salt (POLYQUAT salt) which due to its cationic nature will adhere to the surface of the dispersed solids. The organic coating or layer adhered to the solids provides a receptive surface for the organic impurities, thus allowing formation of a solid-Polyquat-organic Adduct which is easily removed from the Bayer system.

19 Claims, 3 Drawing Figures

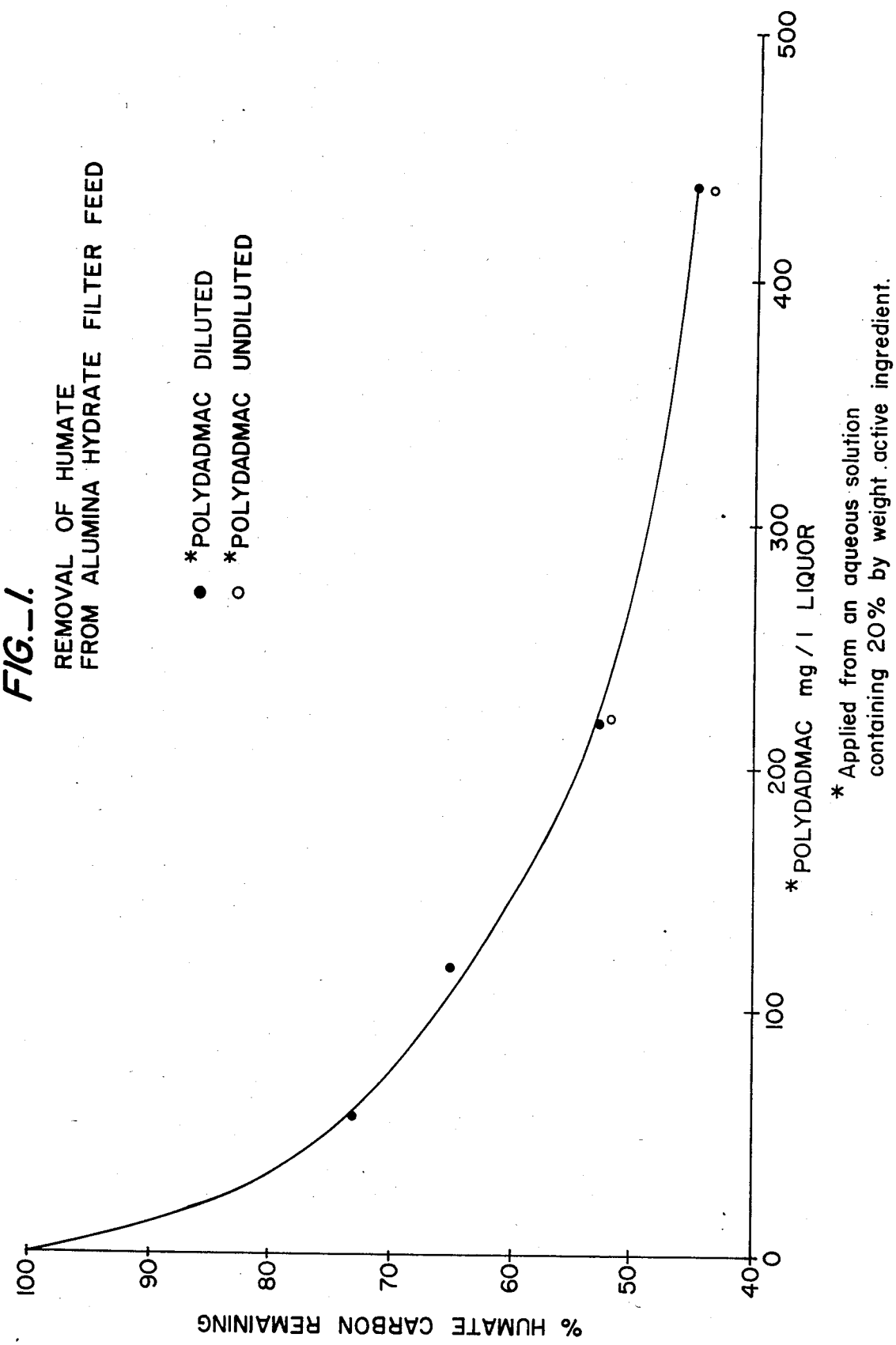

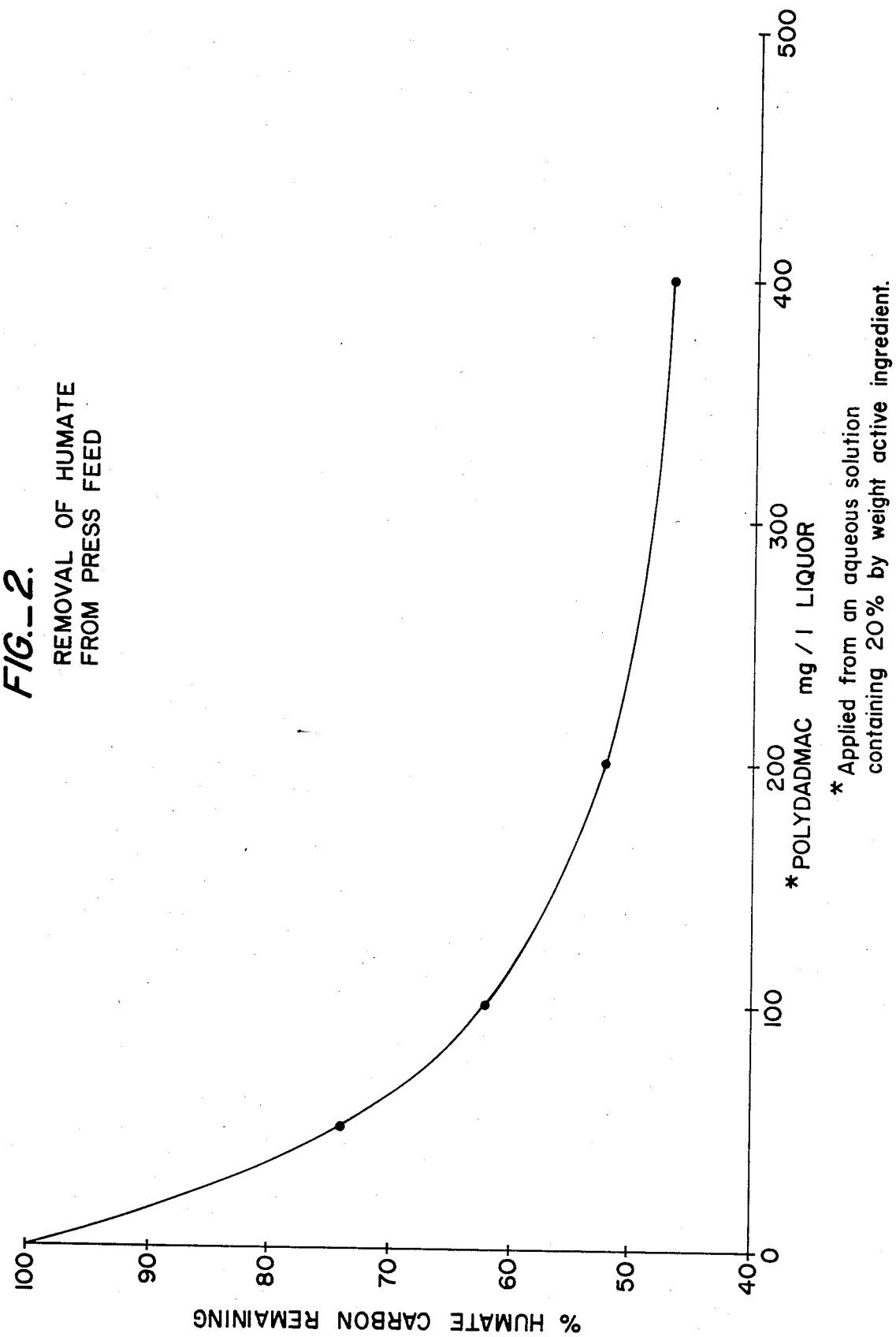

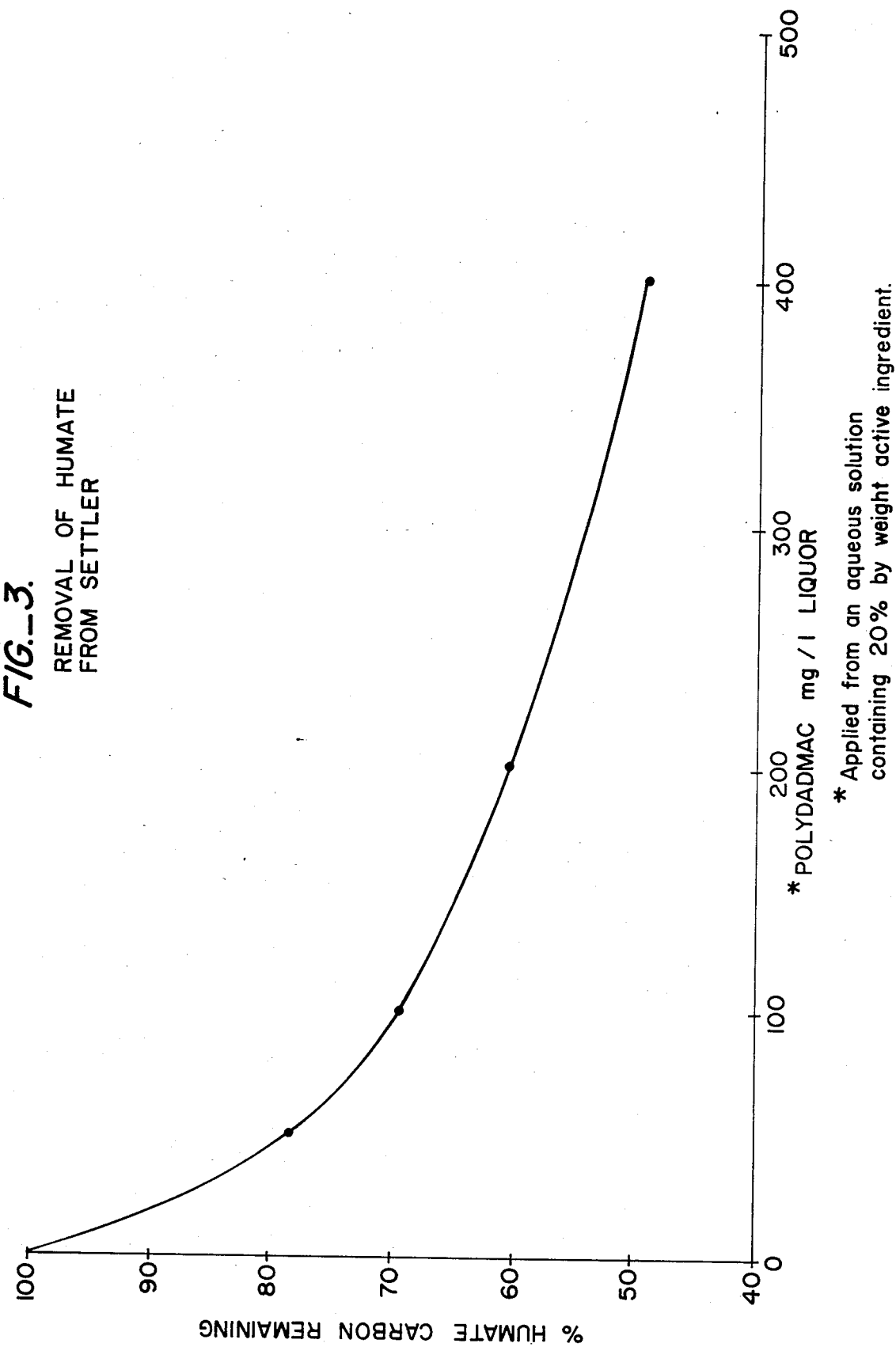

PURIFICATION OF BAYER PROCESS LIQUORS

BACKGROUND OF THE INVENTION

Alumina trihydrate, the precursor of many alumina-based products, including calcined alumina used for making metallic aluminum by reduction, is most commonly obtained from alumina-containing ores, such as bauxite. Recovery of the alumina content of bauxite is generally accomplished by the well-known Bayer process which involves the digestion of the bauxite with a caustic medium at elevated temperatures and pressures. Digestion of the bauxite results in a saturated sodium aluminate liquor, commonly referred to as "pregnant liquor" from which the alumina content is recovered by precipitation, usually through addition of seed alumina. Bauxite is found in many parts of the world and the composition of the ores may vary from place to place. Many bauxites contain organic impurities and these organic impurities will be co-extracted with the alumina content of the ore during digestion and will contaminate the produced liquor. Most of the organic impurity content found in the ores consists of high molecular weight compounds, such as humic acids, a portion of which will decompose to lower molecular weight compounds during the caustic digestion process, thereby producing a whole spectrum of organic salts dissolved in the liquour. A part of the organic impurities dissolved in the liquor consists of color-causing compounds, such as humates, and, consequently, the pregnant liquor will usually possess a dark red color. Since the Bayer process involves extensive recycling of the used caustic liquor to the digestion stage, the organic impurity content of the liquor will continuously increase. The accumulation of organic impurity content can reach such high levels so as to seriously interfere with the economic and efficient production of alumina trihydrate unless such accumulation can be prevented or at least controlled.

Since the control of organic impurity levels in Bayer process liquors is an important facet in the production of alumina trihydrate, several methods have already been developed for such organic impurity level control. It has been suggested in U.S. Pat. No. 4,046,855 (Schepers et al) that organic impurities can be removed from Bayer process liquors by contacting the liquor with a magnesium compound which will form a precipitated mixture of magnesium and aluminum hydroxides. This precipitate, according to the patent, can remove some of the organic impurities either by adsorption or be chemisorption. The magnesium compound may be added at any stage of the Bayer process, additions prior to digestion or to the digested slurry are preferred. Although this process is capable of removing at least a portion of the organic impurities, the formation of a precipitated hydroxide mixture creates operational difficulties. On the one hand, the precipitated hydroxide mixture will contain aluminum hydroxide and this results in product alumina loss; on the other hand, the precipitated mixture has to be separated from the rest of the treated liquor and this involves additional processing steps and/or a definite increase in the quantity of the total mud load which requires disposal.

In U.S. Pat. No. 4,101,629 (Mercier et al), a barium-containing compound is added to Bayer process liquors. The barium compound precipitates as barium aluminate and the precipitated material may also include barium salts of organic impurities present in the liquor. As in the previously discussed patent, this process involves precipitation of a compound which has to be removed from the treated liquor requiring settling and/or filtration equipment and additional processing steps. The process allows recovery and reuse of the filtered barium compound by calcination; however, the well-known toxicity of barium salts may create an unacceptable environmental and/or health risk not justifiable by the purification results obtainable by it.

In U.S. Pat. No. 4,215,094 (Inao et al), a copper-catalyzed wet oxidation process is recommended for the oxidation of organic impurities, followed by addition of a sulfur-containing compound to remove the copper catalyst as a precipitate. The oxidation is accomplished under elevated temperature and pressure conditions in the presence of a catalyst and molecular oxygen. This process has several disadvantages in that a high temperature-pressure digestion has to be applied which involves the use of expensive pressure vessels and substantial energy usage. In addition, the copper catalyst has to be removed from the treated liquor to avoid contamination. Disposal of the removed copper sulfide can create environmental and/or health hazards. In U.S. Pat. No. 4,275,042 (Lever), sodium oxalate, one of the organic impurities in Bayer liquor, is removed from spent Bayer liquor. In the '042 patent, dissolved sodium oxalate is removed from spent Bayer liquor by addition of a cationic sequestrant to the spent liquor. The cationic sequestrant, preferably a simple quaternary nitrogen compound possessing medium and long-chain alkyl groups and a single cationic charge, produces an insoluble product with humic compounds present in the liquor, thus destabilizing the spent liquor with respect to sodium oxalate. Destabilizing allows precipitation of a portion of the oxalate impurity content. Although the method shown in the Lever patent allows removal of a portion of the organic impurity content of the liquor, the insoluble sequestrant-humic acid product will form an oily scum on the surface of the spent liquor and cannot be readily removed from the spent liquor. Elimination of the oily layer from the surface of the liquor cannot be done by conventional filtration. It has to be accomplished either by equipment adapted for this particular purpose or by using a filtration method capable of dealing with semicolloid surface layers. Consequently, the difficulties associated with the process render it impractical.

In U.S. Pat. No. 4,275,043 (Gnyra), a purification method is described which allows reduction of the oxalate impurity level of spent Bayer process liquor. Removal of oxalate and a limited quantity of humic matter is accomplished by treating the impure spent liquor with an adsorbent, such as activated carbon, activated alumina, or clay. These treating agents were known to be effective in removing organic impurities from Bayer process liquors, but, as recognized in U.S. Pat. No. 3,832,442 (Emerson), dealing with the purification of Bayer liquors involves operating difficulties resulting from the use of substantial quantities of treating agents and the requirement to remove from the liquor by one or more filtration stages the particulate and adsorbent and the impurities adhered thereto. For treatment of the large spent liquor volumnes generated in the Bayer process, the suggested purification method would result in significant operating difficulties and expenses.

In U.S. Pat. No. 4,335,082 (Matyasi et al) suggest the removal of organic impurities from impure Bayer liquors by caustifying the liquor with lime, followed by evaporation of the causticized liquor. Evaporation will result in the precipitation of solids containing a large quantity of the organic impurities from the liquor. The solids are separated and then discarded. This method assures the removal of satisfactory quantities of organic impurities from the liquour but the problems associated with the process render it impractical and expensive. To achieve good purification, large volumes of liquor have to be treated with lime and evaporated. These involve large quantities of lime and extensive energy input. Also, by treating large volumes, large losses of soda values can be expected. A similar purification process is disclosed in U.S. Pat. No. 4,280.987 (Yamada et al). In this process, Bayer liquor is first evaporated, then calcined at high temperature after its alumina and caustic content is adjusted to a predetermined level. This process, known in the Bayer industry as "liquor burning", is an effective means of organic impurity removal. Its disadvantages are associated with the large volumes to be evaporated and then calcined, which require substantial capital and energy expenditures.

THE INVENTION

A novel process has now been discovered which is not only effective and economical, but is also capable of being continuously applied without interfering with the usual Bayer process operations or requiring expensive and/or complicated equipment. The instant invention involves the treatment of Bayer process liquors with a water-soluble, cationic, polymeric quaternary ammonium salt in the presence of dispersed solids, said solids being either generated by the Bayer process, such as red mud particles, alumina trihydrate, or oxalate salts, or being added thereto, for example, various filter aids. Treatment of the solids with the cationic polymeric quaternary salt provides an adhered surface coating or layer on the dispersed solids, and this coating or layer creates a receptive surface for the organic impurities present in the Bayer process liquor.

SUMMARY OF THE INVENTION

A process if provided for removing at least a portion of the humate content of Bayer process liquors by treating a Bayer process liquor containing dispersed therein solids either generated by the Bayer process or added thereto to improve filtration, with a water-soluble, cationic polymeric quaternary ammonium salt to form a coating or layer on the surface of the solids. The coating on the solids provides a receptive surface for the humate which forms with the coating an adduct and will be removed from the liquor as such together with the solids. The adduct contains the dispersed solid, the cationic polymeric quaternary ammonium salt and the humate impurities, all bound into a coacervate adduct by adsorptive and/or chemisorptive forces. As opposed to the simple cationic/anionic complexes mentioned above, these coacervated adducts are dense precipitated which are easily removed from Bayer Process liquors and slurries by standard separation techniques such as filtration, flocculation, settling and the like.

The coacervate adduct may be formed by first coating the solids with the polyquaternary salt, or surprisingly may also be formed in situ by adding effective amounts of the polyquaternary salts to humate contaminated liquors in the presence of the solids normally present in these liquors or added to these liquors to improve filtration characteristics.

BRIEF DESCRIPTION OF THE FIGURES

FIG. 1 graphically shows the humate removal efficiency of the polymeric quaternary ammonium salt when applied to precalcination filter feed alumina hydrate as a function of ammonium salt concentration in mg per liter of Bayer process liquor at a predetermined hydrate concentration.

FIG. 2 graphically depicts the humate removal efficiency of the polymeric ammonium salt when applied to press feed liquor as a function of ammonium salt concentration per liter of Bayer process liquor.

FIG. 3 graphically shows the humate removal efficiency of the polymeric ammonium salt when applied to red mud containing slurries.

DETAILED DESCRIPTION OF THE INVENTION

This invention relates to the purification of Bayer process liquors, and more particularly it concerns a process for the removal or at least reduction of the organic impurity level of Bayer process liquors. For the purposes of the invention, the terms "Bayer process liquors" or "liquor" relate to any caustic liquor which is generated in the Bayer process or is used to dissolve alumina values from bauxite. Typical examples of Bayer process liquors include pregnant liquor, spent liquor, washer underflow, and slurries containing precipitated alumina hydrate, as well as the liquor containing dispersed red mud particles. All of these liquors have varying caustic contents and contain organic impurities. The terms "organic impurity" or "organic impurities" refer to organic matter present in Bayer process liquors, the type and quantity of which varies considerably with bauxite source and Bayer plant operating conditions. The greater part of the organic impurities is present as the alkali salts of organic acids which are colorless and, apart from the oxalate content, present only a minor problem from the viewpoint of the quality of the alumina trihydrate produced from the liquor. Process conditions and alumina hydrate quality are significantly affected by portions of highly colored materials most often called "humates", although they may include lignin derivatives. These colored materials are of uncertain composition and possess complex structures. For simplicity, all of these colored materials present in Bayer process liquors are referred to hereinafter as "humates". The presence of humates in Bayer process liquors not only affects the quality of the produced alumina hydrate but these colored materials also act as stabilizers for other dissolved organic impurities, for example, alkaki salts of oxalic acid. In fact, it is believed that the humates extracted with the bauxite ores may lead to the presence of the majority of low molecular weight organic acids and impurities above.

This stabilizing effect of the humates keeps the lower molecular weight organic impurities in solution until over-saturation concentration is reached or exceeded, uncontrollable precipitation of these lower molecular weight compounds, particularly fine oxalates, can occur during precipitation of alumina hydrate and the coprecipitated oxalate can seriously interfere with the production of satisfactory alumina hydrate. For example, the oxalate can coat the produced hydrate, requiring extensive washing operations to remove the adhered oxalate from the hydrate surface. The precipitated oxalate can cause nucleation of alumina hydrate resulting in the formation of very finely distributed hydrate which due to the small particle size will not meet product standards. The oxalate can also precipitate on the surface of alumina hydrate seed added to pregnant liquor for the production of alumina hydrate, thus preventing precipitation of the desired product hydrate. In the equipment used in the Bayer process, uncontrolled precipitation of the oxalate can cause serious scaling of process vessel walls resulting in reduced heat-transfer efficiency and additional labor involved in the removal of the scale. Thus, it can be readily concluded that control of the humate content of Bayer process liquors is of paramount interest if a satisfactory alumina hydrate is to be produced in an efficient and economic manner.

The present invention is directed to a control of the humate or colored organic matter content of Bayer process liquors. This goal is achieved by removal or at least significant reduction of humate content by treating Bayer process liquors containing humates in the presence of dispersed solids with a water-soluble, cationic, polymeric quaternary ammonium salt. The dispersed solids can be the type generated by the Bayer process, for example, red mud particles, alumina trihydrate or hydrate, and oxalate salts. The dispersed solids also include various filter aids which are generally incorporated in the liquor prior to filtration. Such filter aids may include certain calcium compounds, for example, calcite, aragonite, or hydrated calcium aluminate which enhance the filtration step. The dispersed solids may also include pretreated filter aids or pretreated seed crystals which are added to the Bayer process prior to reaction with the water soluble cationic polymeric quaternary ammonium salts of this invention, thereby forming a solid-Polyquaternary salt Adduct, which Adduct may then be advantageously added to Bayer process liquors to remove humates and color bodies. For example, filter aids may be precoated with the Polyquaternary salts prior to being used to precoat the filters used to remove colloidal matter prior to seeding and crystallizing aluminum trihydrate.

The preferred water-soluble, cationic, polymeric quaternary ammonium salt employed in the present process is a polydiallyl dimethyl ammonium chloride (POLYDADMAC) compound containing the monomer diallyl dimethyl ammonium chloride (DADMAC) which has the following chemical structure.

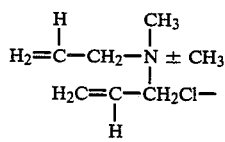

Polymerization of this monomer may be accomplished by standard vinyl polymerization techniques, but is preferably completed by free radical initiation of this vinylic monomer, in the presence or absence of other vinylic monomers such as acrylamide, methylacrylate, and the like. Polymers of this type are described in Butler, U.S. Pat. No. 3,288,770, which is incorporated herein by reference. Polymerization may be accomplished with the DADMAC monomer alone, leading to homopolymers, or with DADMAC and other vinylic monomers, leading to DADMAC containing copolymers. Such copolymers are illustrated in Table I.

TABLE I*

| Polymer Type | Dosage mg Polymer/l | Absorbance** | % Reduction in Absorbance |
|---|---|---|---|
| Poly-DADMAC, [ ] = 0.2 | 0 | 0.078 | — |
| " | 20 | 0.068 | 13% |
| " | 50 | 0.058 | 27% |
| " | 100 | 0.050 | 36% |
| " | 200 | 0.034 | 56% |
| Poly-DADMAC, [ ] = 0.6–0.8 | 0 | 0.070 | — |
| " | 20 | 0.056 | 20% |
| " | 50 | 0.042 | 40% |
| " | 100 | 0.034 | 51% |
| " | 200 | 0.030 | 57% |
| Poly-DADMAC, [ ]- 1.0–1.2 | 0 | 0.075 | — |
| " | 20 | 0.060 | 20% |
| " | 50 | 0.063 | 16% |
| " | 100 | 0.050 | 33% |
| " | 200 | 0.039 | 52% |
| epi-Chlorohydrin/DMA/NH$_3$ | 0 | 0.075 | — |
| " | 20 | 0.068 | 9% |
| " | 50 | 0.069 | 8% |
| " | 100 | 0.065 | 13% |
| " | 200 | 0.063 | 16% |
| Ethylene Dichloride/NH$_3$ | 0 | 0.075 | — |
| " | 20 | 0.077 | 0% |
| " | 50 | 0.077 | 0% |
| " | 100 | 0.074 | 1% |
| " | 200 | 0.062 | 17% |
| DADMAC/Acrylamide Copolymer RSV = 4.8 | 0 | 0.083 | — |
| DADMAC/Acrylamide Copolymer RSV = 4.8 | 20 | 0.073 | 12% |
| DADMAC/Acrylamide Copolymer RSV = 4.8 | 50 | 0.071 | 15% |
| DADMAC/Acrylamide Copolymer RSV = 4.8 | 100 | 0.068 | 18% |
| DADMAC/Acrylamide Copolymer RSV = 4.8 | 200 | 0.066 | 21% |
| DADMAC/Acrylamide Copolymer RSV = 2.3 | 0 | 0.083 | — |
| DADMAC/Acrylamide Copolymer RSV = 2.3 | 20 | 0.085 | 0% |
| DADMAC/Acrylamide Copolymer RSV = 2.3 | 50 | 0.078 | 6% |
| DADMAC/Acrylamide Copolymer RSV = 2.3 | 100 | 0.077 | 7% |
| DADMAC/Acrylamide Copolymer RSV = 2.3 | 200 | 0.070 | 16% |

*Spent liquors contaminated with recyclable humates were tested with prescribed amounts of various polyquaternary salts listed above. In each test, 10 grams of aluminum trihydrate seed was added to 100 ml of liquor which had been heated to 145–150° F.. To this dispersed solid media was added the cationic polymers listed in Table I. Mixing time was approximately 15 minutes, after which the slurry was filtered through Whatman #42 filter paper. Absorbance measurements were made on the filtrates.
**Absorbance is measured at 691 nm using a 1 cm cell and a Bausch and Lomb 100 spectrophotometer.

The preferred POLYDADMACS to be used in this invention are homopolymers/DADMAC and have an Intrinsic Viscosity of at least 0.1 and preferably have an Intrinsic Viscosity ranging between about 0.3 to about 1.0. As stated previously, POLYDADMAC may also refer to other vinylic polymers containing DADMAC monomer, such as copolymers of DADMAC and acrylamide. When copolymers are used, the Intrinsic Viscosities are at least 0.2 and may range as high as 1.5 or above.

The term "Intrinsic Viscosity" as used herein refers to the viscosity-molecular weight relationship as described in detail in chapter IV of "Polymer handbook", Edited by J. Brandrup and E. H. Immergent, Published by Interscience Publishers, New York, 1966.

The terms "POLYDADMAC", "treating agent" or "Polyquaternary Salt" as used hereinafter refer to the water-soluble, polymeric cationic quaternary ammonium salt utilized in the present invention to accomplish the purification of the Bayer process liquors. Table I describes other types of polyquaternary salts which function in this invention, however, the scope of the invention is not limited thereto, since it is expected that other polyquaternary salts which can tolerate the pH extremes of the Bayer process will also function to remove humates.

Incorporation of the polymeric cationic quaternary ammonium salt (hereinafter "POLYDADMAC", "Polyquaternary Salt" or "treating agent") in Bayer process liquors can be suitably accomplished in those Bayer process stages where the liquor either contains dispersed solids or to which solids may be added and dispersed. These stages include the settler(s) in which the residue from the digestion of bauxite, red mud, is separated from the "pregnant" liquor containing the desired sodium aluminate; and the washers in which the red mud discharged from the settler(s) is washed to recover alumina and soda values. The flocculation of the mud in the settler(s) and washers is achieved with the aid of either natually occurring settling aids, such as starch, or any of the commercial synthetic flocculants suitable for red mud. It was found that effective removal of humates is accomplished by addition of POLYDADMAC directly to the red mud slurry prior to treatment with flocculants and charging to the settler(s).

Generally, the concentration range of POLYDADMAC per liter of slurry treated is within the range from about 1.0 mg to 500 mg and preferably within the range from about 2.0 mg to 50 mg depending upon the solids concentration of the slurry. Generally the POLYDADMAC is added as an aqueous solution containing from 10 to about 50 weight % active polymer. Advantageously, the required quantity of POLYDADMAC is applied to the mud slurry from an aqueous solution, however, spent liquor may also be used as a dispersing medium. Contact of the humate-containing liquor with the POLYDADMAC coated mud results in at least a reduction of the humate content of the liquor which can be readily observed by a change in the color of the treated liquor. Quantitative determination of humate removal can be achieved by well-known colorimetric methods using a conventional colorimeter. It was discovered that when the POLYDADMAC quantity applied to the mud slurry is within the broad range shown above, reduction in humate content (as determined colorimetrically) can range from about 7% to more than about 50%. The humates removed from the liquor are adhered or bound to the mud and are discarded together with the mud discharge, thus providing a convenient way of disposal. Alternatively, POLYDADMAC can be added to any of the red mud slurry streams which feed into the mud washers. The introduction of POLYDADMAC prior to the settler(s) or washers, instead of directly into the said vessels, ensures the effective dispersion of the treating agent onto the mud particles, and eliminates any possibility of interference with the flocculant used to settle the mud.

In another advantageous embodiment of the invention, humate is removed from press feed liquor. The pregnant liquor charged to the press feed tank still contains suspended solids which have to be removed prior to subjecting the pregnant liquor to seeded precipitation. Removal of the suspended solids is generally accomplished by filtration in the presence of filter aids, such as certain calcium compounds. Conventionally, Kelly-type filters are employed and the filters can be coated with a calcium-containing filter aid which allows efficient filtration of the pregnant liquor-containing suspended solids. It was found that effective removal of humates can be accomplished by introducing the POLYDADMAC into the filter aid slurry prior to the subsequent mixing of the filter aid with the press feed liquor. Coating of the surface of the filter aid accomplished two purposes. On the one hand, uniform distribution of the treating agent on the surface can be assured; on the other hand, good contact with the humate-contaminated liquor can be achieved. Alternatively, the treating agent can be introduced into the press feed liquor after the dispersion of the POLYDADMAC is assured. It is to be understood that any other type of filter can be equally utilized in the treatment, and in lieu of the calcium-containing filter aid, other types of filter aids, such as cellulosic materials, can also be employed.

It was found that the quantity of POLYDADMAC to be applied to the filter aid surface for achieving humate removal is relatively small. Generally, the concentration range of POLYDADMAC per liter of liquor treated is within the range from about 1.0 mg to about 400 mg and preferably within the range from about 2.0 mg/l to about 50 mg/l. Advantageously, the required quantity is applied to the surface of the filter aid from an aqueous solution; however, spent liquor may also be used as a dispersing medium. Contact of the humate-containing liquor with the POLYDADMAC-coated filter aid results in a reduction of the humate content of the liquor which can be readily observed by a change in the color of the filtrate liquor. Quantitative determination of humate removal is accomplished as previously described. It was discovered that when the treating agent quantity applied to the filter aid is within the broad range shown above, reduction in humate content (as determined colorimetrically) can range from about 8% to more than about 55%. The humates removed from the liquor are adhered or bound to the filter aid and are discarded together with the used filter aid, thus providing a convenient way of disposal. If the filter aid is regenerated, for example, by calcination of the calcium-containing used filter aid, the humates are destroyed during calcination and the regenerated filter aid can then be reused without danger of being contaminated or causing contamination.

In another advantageous embodiment of the invention, the removal of humates from Bayer process liquor is accomplished during the hydrate filtration stage of the Bayer process. The hydrate filtration stage of the Bayer process consists of filtering precipitated and, if desired, washed alumina hydrate. The filtered hydrate is then subjected to calcination to convert it to reduction-grade alumina oxide. The resultant filtrate from the filtration step is usually recycled to the Bayer process. This alumina hydrate slurry contains humates which, if not removed, would be recycled to the Bayer process. Thus, removal of the humates in this filtration stage would prevent or, at least, reduce accumulation of humates through recycle of the filtrate. It has been discovered that humates can be successfully removed from the alumina hydrate slurry by introducing POLYDADMAC into the slurry to be filtered. Introduction of the POLYDADMAC into the slurry is suitably accomplished by coating the surface of alumina hydrate with the POLYDADMAC and charging the coated hydrate into the slurry. In the alternative, the treating agent may also be introduced into the slurry itself without precoating alumina hydrate and if good dispersion of the treating agent in the slurry is assured, then the POLYDADMAC will uniformly coat the surface of the alumina hydrate present in the slurry. The coated hydrate will allow removal of the humates from this slurry by the contact of the surface adhered POLYDADMAC with the humates.

The quantity of POLYDADMAC to be added to the slurry is within the range from about 2.5 mg to about 400 mg per liter of slurry. Optimum results in terms of humate removal can be achieved when treating agent quantities within the range from about 10 mg to about 150 mg per liter of slurry are applied. The measure of humate removal is conveniently determined by colorimetric methods which involve measuring the reduction in color of the filtrate against a filtrate obtained from an untreated slurry. When POLYDADMAC quantities referred to above are utilized, color reductions from about 10-60% can be achieved. The humates removed from the slurry will be on the surface of the filtered alumina and will be destroyed during calcination. Consequently, there is no need for purifying the hydrate or for providing disposal means required by prior art processes.

In the following examples, illustrations are provided for practicing the invention. In all cases, the POLYDADMAC materials added to the test slurries or liquors were aqueous solutions containing about 20 weight percent active POLYDADMAC homopolymer.

EXAMPLE I

Humate removal was accomplished from a Bayer process liquor containing precipitated alumina hydrate solids. The liquor or slurry employed in the instant purification process was a characteristic alumina hydrate slurry commonly used as feed to hydrate filters preceding the calcination stage of the Bayer process. Under normal Bayer process practice, the filtered hydrate is charged directly to the calciners for conversion to reduction-grade alumina ($Al_2O_3$) while the filtrate is recycled to the Bayer process.

The slurry utilized in this example had an average solids concentration of 50.7% by weight, a temperature of about 58° C. (137° F.) and this slurry was pumped to a conventional filter at an average rate of 1041 l/min (275 gpm). For the removal of the humate content of the liquor, the treating agent, POLYDADMAC, was introduced as both a 20% active solution, as well as a dilution of the 20% active product, to allow comparison as far as surface coating of the hydrate and humate removal efficiency was concerned. Introduction of the POLYDADMAC was at the suction side of the pump feeding the slurry to the filter. To establish the required dosage of POLYDADMAC, the quantity of the treating agent was varied. The humate removal efficiency was established by colorimetric means which involved measuring the absorbance of the liquor phase prior to addition of the POLYDADMAC and the absorbance of the filtrate.

Determination of the absorbances was accomplished at 691 nm in a 4 cm cell in a Pye Unicam Model 6-350 spectrophotometer.

In the tests, the following dosages of a 20% active POLYDADMAC product were introduced without further predilution to the suction side of the pump: 218 mg/l of liquor and 436 mg/l of liquor. Tests were also conducted with prediluted POLYDADMAC solution product introduced in the following per liter of liquor concentrations: 56 mg, 116 mg, 216 mg, and 437 mg. The charging of the POLYDADMAC to the slurry was continuous and absorbance measurements of the filtrates were made after equilibrium conditions were established between the different dosages of POLYDADMAC. The reductions in humate content for the above-mentioned POLYDADMAC dosages were tabulated and are shown in Table II and also graphically illustrated in FIG. 1.

TABLE II

Effect of POLYDADMAC in Humate Removal from Alumina Hydrate Slurries

| POLYDADMAC* DOSAGE in mg/l liquor | Removal of humate in wt. |
|---|---|
| 56 | 27 |
| 116 | 35 |
| 216 | 45 |
| 437 | 55 |
| 218** | 37 |
| 436** | 58 |

*20% active solution in water
**added without further dilution

It can be observed that addition of the treating agent in original solution and diluted solution form does not materially affect the humate removal efficiency. This is believed to be the result of the turbulence generated in the pump which will assure uniform distribution of the POLYDADMAC solutions within the slurry to be treated.

EXAMPLE II

Humate removal from Bayer process liquor obtained after separation of the red mud residue through settling was practiced. The pregnant liquor, as received from the mud settler overflow, was treated with POLYDADMAC prior to filtration aimed at removal of residual dispersed red mud particles. The pregnant liquor, also called "press feed", due to the conventionally employed Kelly press filters for such solids removal, is generally filtered in the presence of a solid filter aid which significantly improves the filtration efficiency. Addition of the POLYDADMAC was accomplished in a manner to allow utilization of the solid filter aid as a "carrier" for the cationic polymeric treating agent. For the humate removal tests, solution POLYDADMAC product (20% active) dosages of 18, 31, and 57 mg/l of press feed were employed. The POLYDADMAC treating agent was at first diluted with water to concentrations corresponding to 194, 324, and 302 mg/l, respectively, prior to charging to the press feed. The POLYDADMAC-containing press feed was then filtered on conventional press filters which had a filter aid precoat prior to contact with the POLYDADMAC-containing press feed. Humate removal was determined by measuring the absorbances of the filtrates obtained and the absorbances of the untreated press feed. The humate removal results are shown in Table III and in FIG. 2.

TABLE III

Effect of POLYDADMAC in Humate Removal from Bayer Process Press Feed

| POLYDADMAC* DOSAGE in mg/l press feed | Humate Removal % by weight |
|---|---|
| 50 | 26 |
| 100 | 38 |

TABLE III-continued
Effect of POLYDADMAC in Humate Removal from Bayer Process Press Feed

| POLYDADMAC* DOSAGE in mg/l press feed | Humate Removal % by weight |
|---|---|
| 200 | 48 |
| 400 | 53 |

*20% active solution in water

It can be observed from the above results that humate removal can be accomplished from a highly concentrated Bayer process liquor by using the filter aid as a "carrier" for the treating agent.

EXAMPLE III

Tests were also conducted to establish the effectiveness of POLYDADMAC in the removal of humates from digested Bayer process slurries, the slurries being treated prior to the separation of the red mud by settling. Settler feed slurry having a temperature in the range from about 90°–99° C. (194°–210° F.) was contacted with varying dosages of the 20% active POLYDADMAC solution and the absorbances of the treated slurry, after removal of the red mud, were compared to the absorbance value obtained from the untreated slurry. The results of the test are shown in Table IV and also in FIG. 3.

TABLE IV
Removal of Humates from Red Mud-Containing Slurries

| POLYDADMAC* DOSAGE in mg/l slurry | Humate Removal in % by weight |
|---|---|
| 0 | 0 |
| 50 | 28 |
| 100 | 31 |
| 200 | 39 |
| 400 | 51 |

*20% active solution in water

Addition of the POLYDADMAC to the red mud slurries is shown to be an effective means of reducing the harmful humate content of the Bayer process liquor. It was further found that the cationic polymeric ammonium salt does not interfere with the flocculating ability of the conventional anionic flocculants generally added to red mud slurries to improve settling of the red mud. Consequently, the POLYDADMAC can be readily incorporated into the red mud slurries either before or after the addition of the conventional flocculants. It is however, preferred to add the Polyquaternary salts prior to addition of flocculant.

It will be understood by those skilled in the art that the various embodiments described herein have many equivalents and that the only limitations on the present invention are those set forth in the appended claims.

We claim:

1. A process of removing humate-type organic impurities from Bayer process liquors and slurries containing dispersed solids therein, said solids generated either by the Bayer process or added thereto, which comprises introducing into the liquor a water-soluble, vinylic cationic polymetric quaternary ammonium salt in an amount sufficient to form at least a partial coating on the dispersed solids, maintaining the coated solids in contact with the liquor for a time sufficient to remove at least a portion of the humate present in the liquor through adhesion of the humate to the coating, removing the coated solids having the adhered humate thereon from the liquor and recovering a liquor having a significantly reduced humate content.

2. A process according to claim 1, wherein the water soluble cationic polymeric quaternary ammonium salt is a vinylic cationic polymer containing diallyl dimethyl ammonium chloride monomer, the polymer having an Intrinsic Viscosity of at least 0.1.

3. A process according to claim 2, wherein the Intrinsic Viscosity of the polymer is in the range from about 0.3 to about 1.0.

4. A process according to claim 2 wherein the polymeric quaternary ammonium salt is a homopolymer of diallyl dimethyl ammonium chloride having an Intrinsic Viscosity of at least 0.1.

5. A process according to claim 1, wherein the dispersed solid is alumina hydrate.

6. A process according to claim 1, wherein the liquor is a red mud slurry, the dispersed solids are red mud particles and the cationic polymeric quaternary chloride is added to the red mud slurry prior to the separation of the red mud particles from the liquor.

7. A process according to claim 1, wherein the liquor is press feed liquor and the dispersed solids are filter aid particles.

8. A process according to claim 1, wherein the filter aid particles are first treated with the cationic polymeric quaternary ammonium salt and then the treated filter aid is added to the press feed liquor.

9. A process according to claim 1, wherein the dispersed solids are oxalate salts.

10. A process according to claim 1, wherein the liquor having significantly reduced humate content is recycled to the Bayer process.

11. A process of removing humate-type organic impurities from Bayer Process liquors and slurries which comprises adding to said liquors and slurries an effective amount of a water-soluble vinylic cationic polymeric quaternary ammonium salt in the presence of dispersed solids, said solids being generated naturally by the Bayer process or being added thereto, thereby forming a solid-polymeric quaternary ammonium salt-humate impurities coacervated adduct; then removing said adduct from the liquors and slurries and recovering a liquor having significantly reduced humate content.

12. The process of claim 11 wherein the water soluble cationic polymeric quaternary ammonium salt is a vinylic cationic polymer containing diallyl dimethyl ammonium chloride monomer.

13. The process of claim 12 wherein the vinylic cationic polymer is a homopolymer of diallyl dimethyl ammonium chloride having an Intrinsic Viscosity of at least 0.1.

14. The process of claim 13 wherein the homopolymer has an Intrinsic Viscosity ranging between about 0.3 to 1.0.

15. The process of claim 11 wherein said dispersed solids are chosen from the group consisting of alumina hydrate, red mud, calcium containing filter aids, oxalate salts, and mixtures thereof.

16. The process of claim 11 wherein the liquors are a red mud slurry, the dispersed solids are red mud particles, and the polymeric quaternary ammonium salt is a homopolymer of diallyl dimethyl ammonium chloride and is added to the red mud slurry prior to addition of flocculant and separation of red mud particles from the liquor.

17. The process according to claim 11 wherein the liquor is press feed liquor and the dispersed solids are calcium containing filter aid particles.

18. The process of claim 17 wherein the calcium containing filter aid particles are first treated with water soluble polymeric quaternary ammonium salts and then added to the press feed liquor.

19. The process according to claim 11 wherein the liquor having significantly reduced humate content is recycled to the Bayer Process.

* * * * *